No. 892,099. PATENTED JUNE 30, 1908.
F. TONE.
APPARATUS FOR MANUFACTURING CIGARETTES WITH MOUTHPIECES.
APPLICATION FILED APR. 13, 1906.
15 SHEETS—SHEET 1.
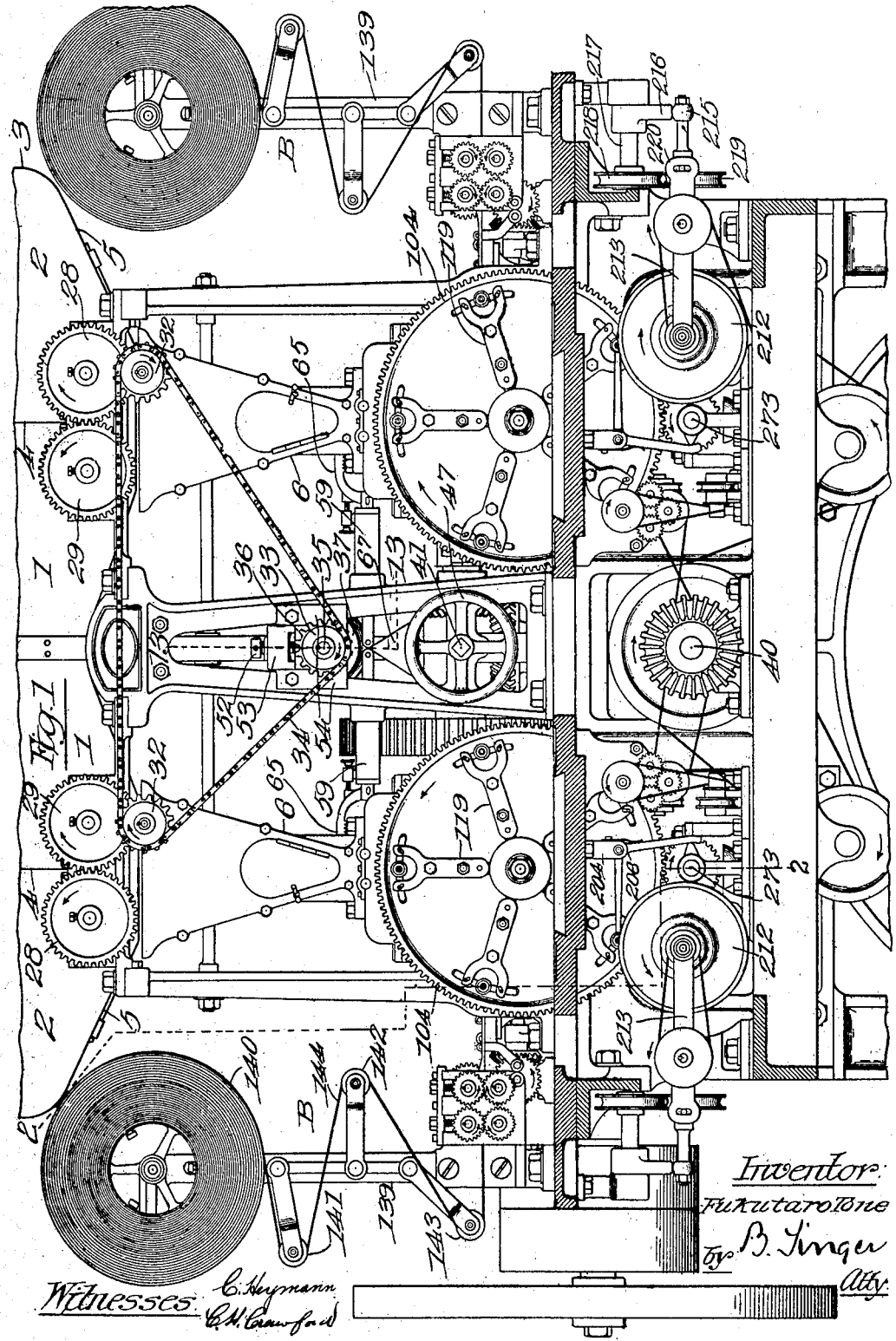

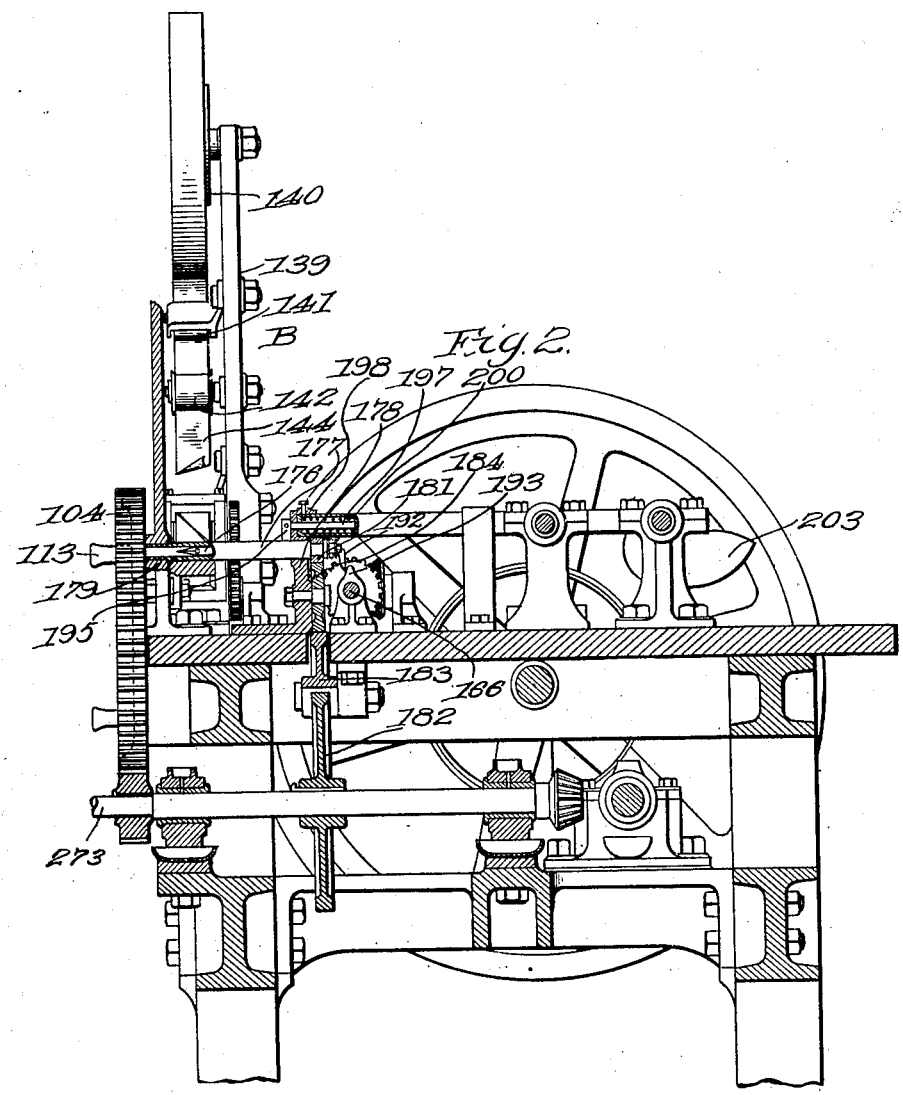

No. 892,099.
F. TONE.
APPARATUS FOR MANUFACTURING CIGARETTES WITH MOUTHPIECES.
APPLICATION FILED APR. 13, 1906.
PATENTED JUNE 30, 1908.
15 SHEETS—SHEET 3.
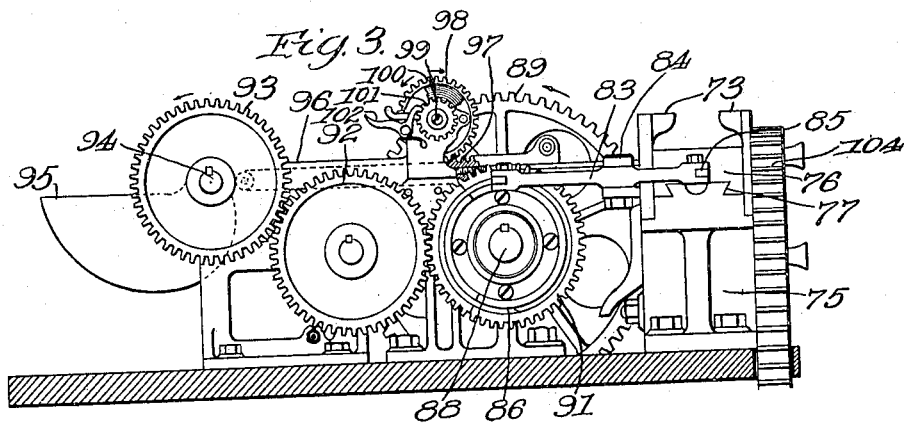
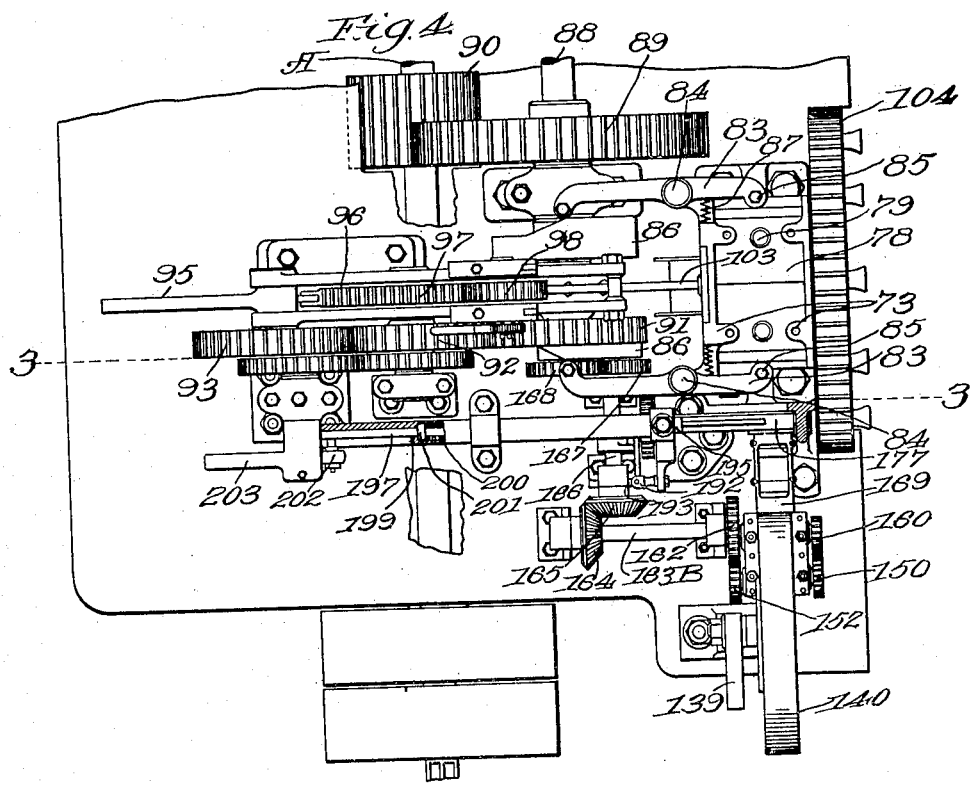
Witnesses:
C. H. Crawford
C. Heymann
Inventor:
Fukutaro Tone
By B. Singer
Atty.

No. 892,099. PATENTED JUNE 30, 1908.
F. TONE.
APPARATUS FOR MANUFACTURING CIGARETTES WITH MOUTHPIECES.
APPLICATION FILED APR. 13, 1906.
15 SHEETS—SHEET 4.
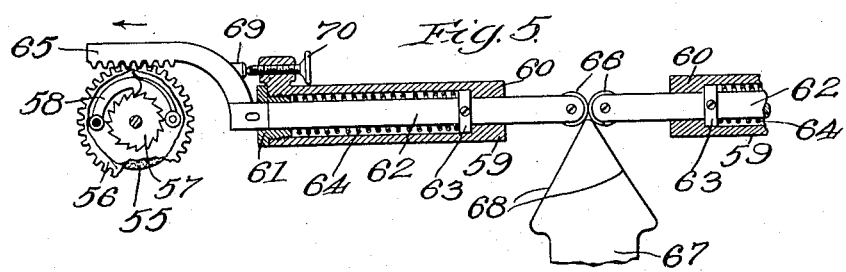
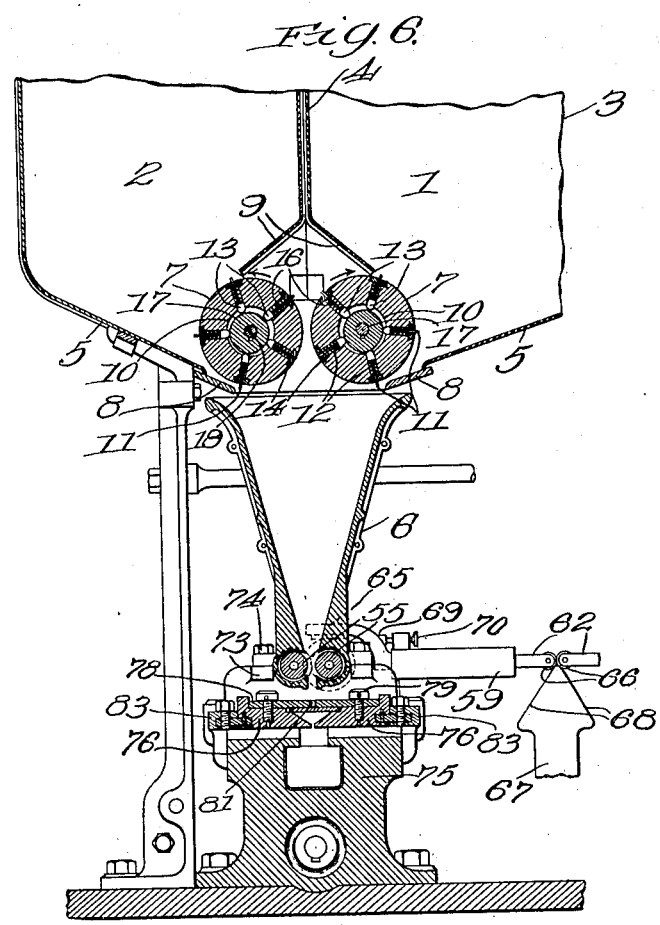
Witnesses:
C. H. Crawford
C. Heymann
Inventor:
Fukutaro Tone
By B. Singer
Atty.

No. 892,099. PATENTED JUNE 30, 1908.
F. TONE.
APPARATUS FOR MANUFACTURING CIGARETTES WITH MOUTHPIECES.
APPLICATION FILED APR. 13, 1906.
15 SHEETS—SHEET 5.
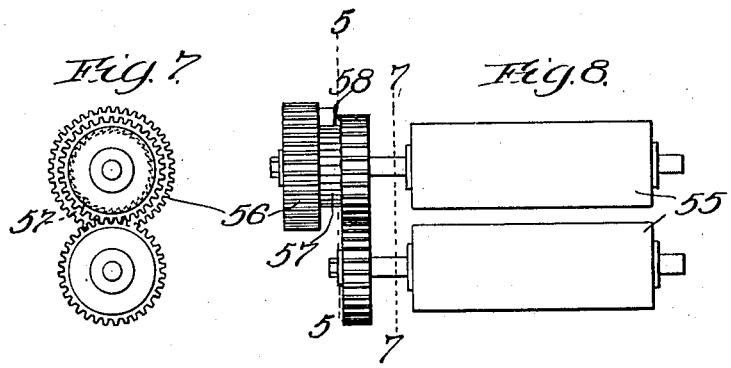
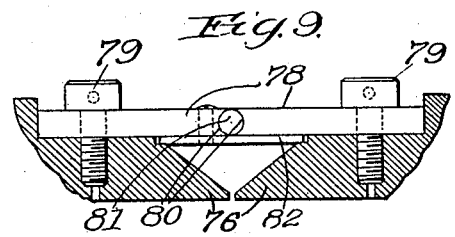
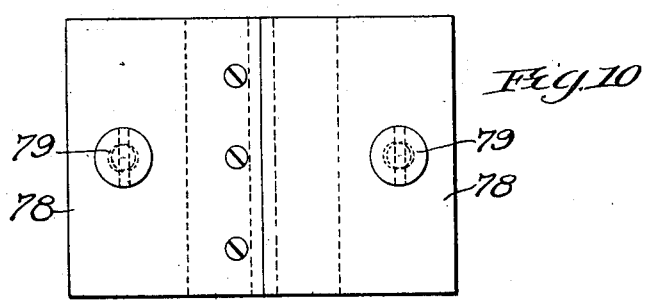

No. 892,099.  
PATENTED JUNE 30, 1908.  
F. TONE.  
APPARATUS FOR MANUFACTURING CIGARETTES WITH MOUTHPIECES.  
APPLICATION FILED APR. 13, 1906.  
15 SHEETS—SHEET 6.
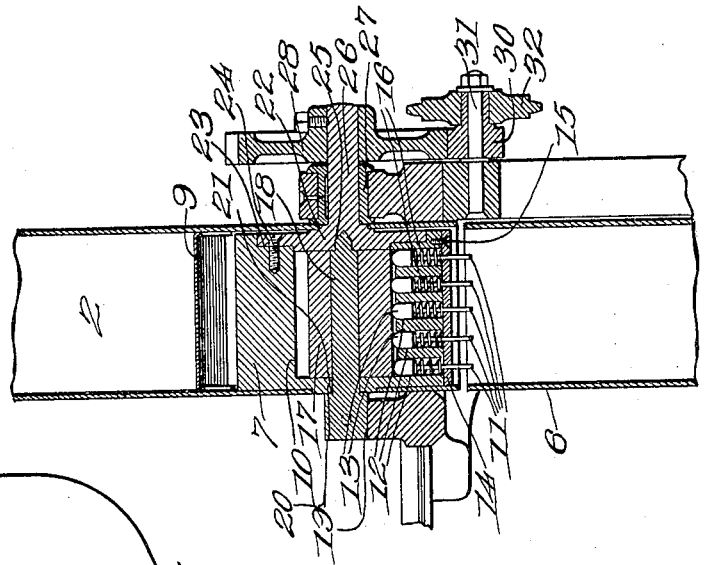
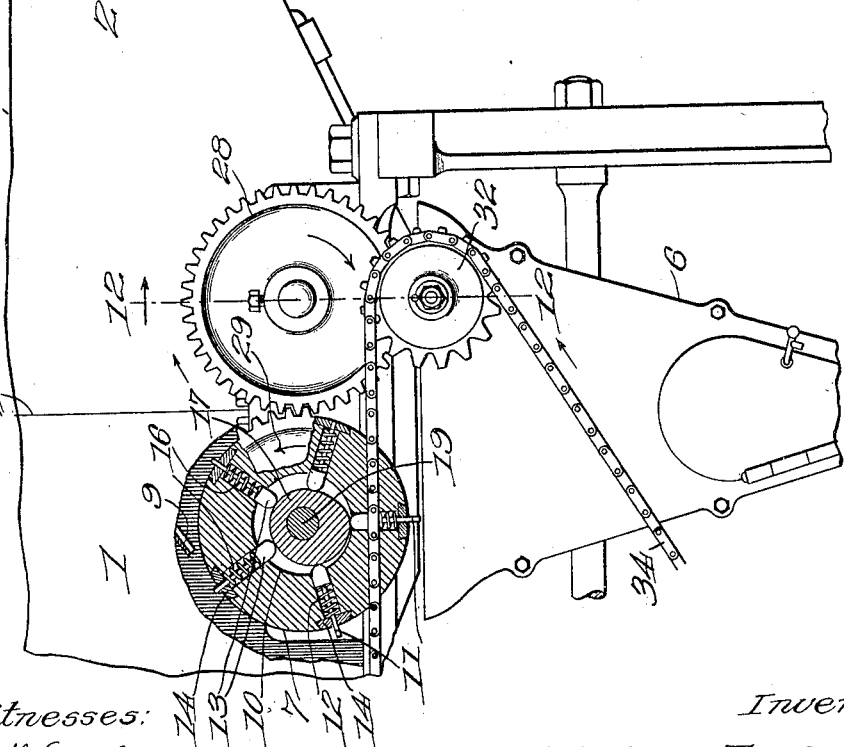
Witnesses:  
C. H. Crawford  
C. Heymann
Inventor:  
Fukutaro Tone  
By B. Singer  
Atty.

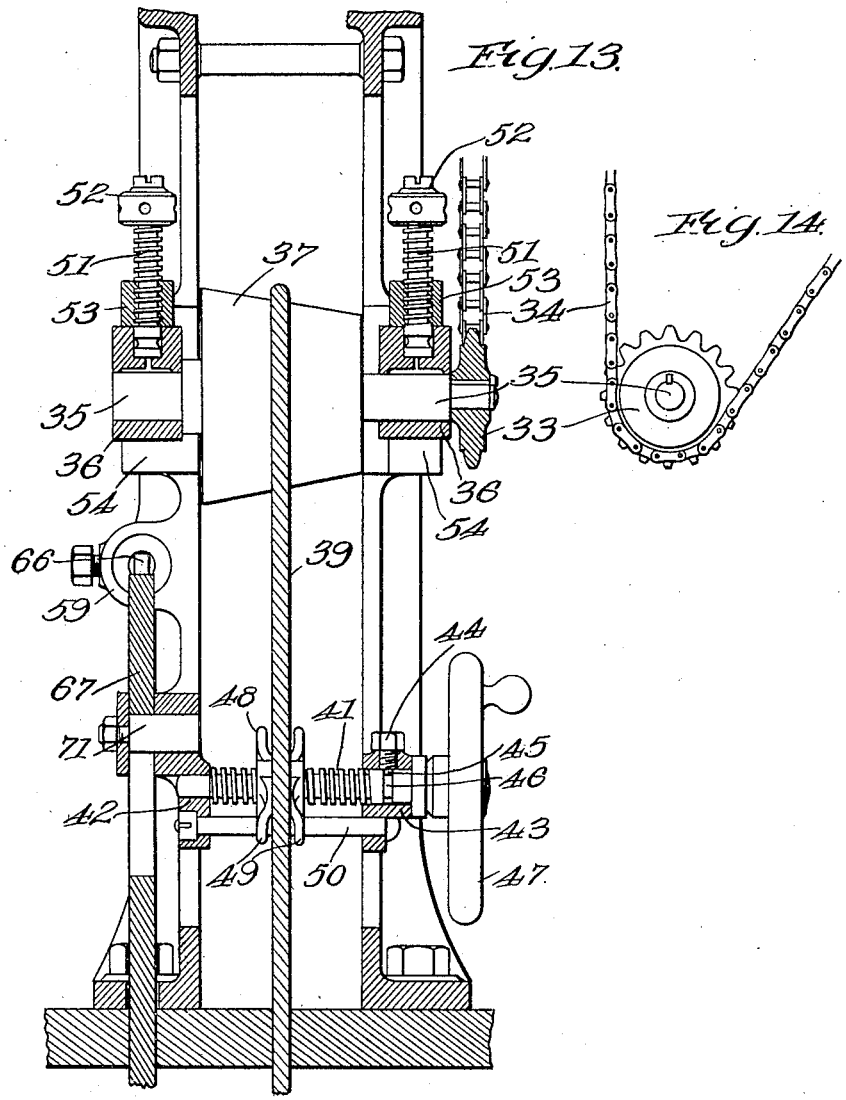

No. 892,099. PATENTED JUNE 30, 1908.
F. TONE.
APPARATUS FOR MANUFACTURING CIGARETTES WITH MOUTHPIECES.
APPLICATION FILED APR. 13, 1906.
15 SHEETS—SHEET 8.
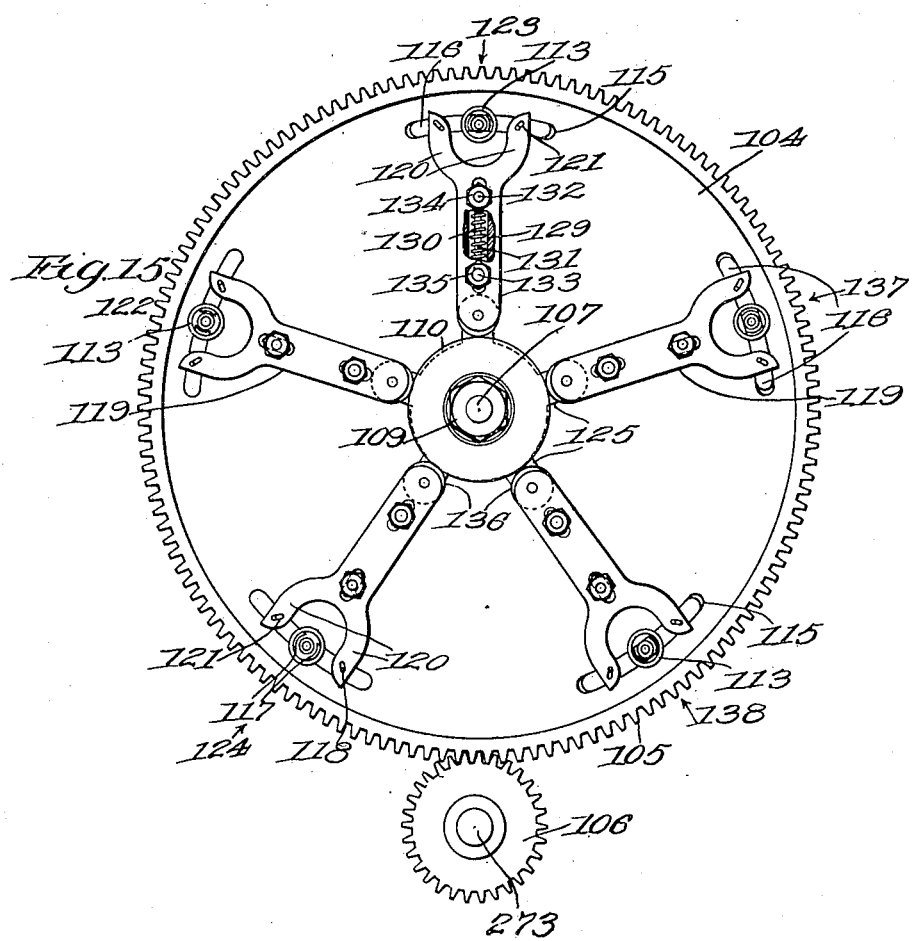

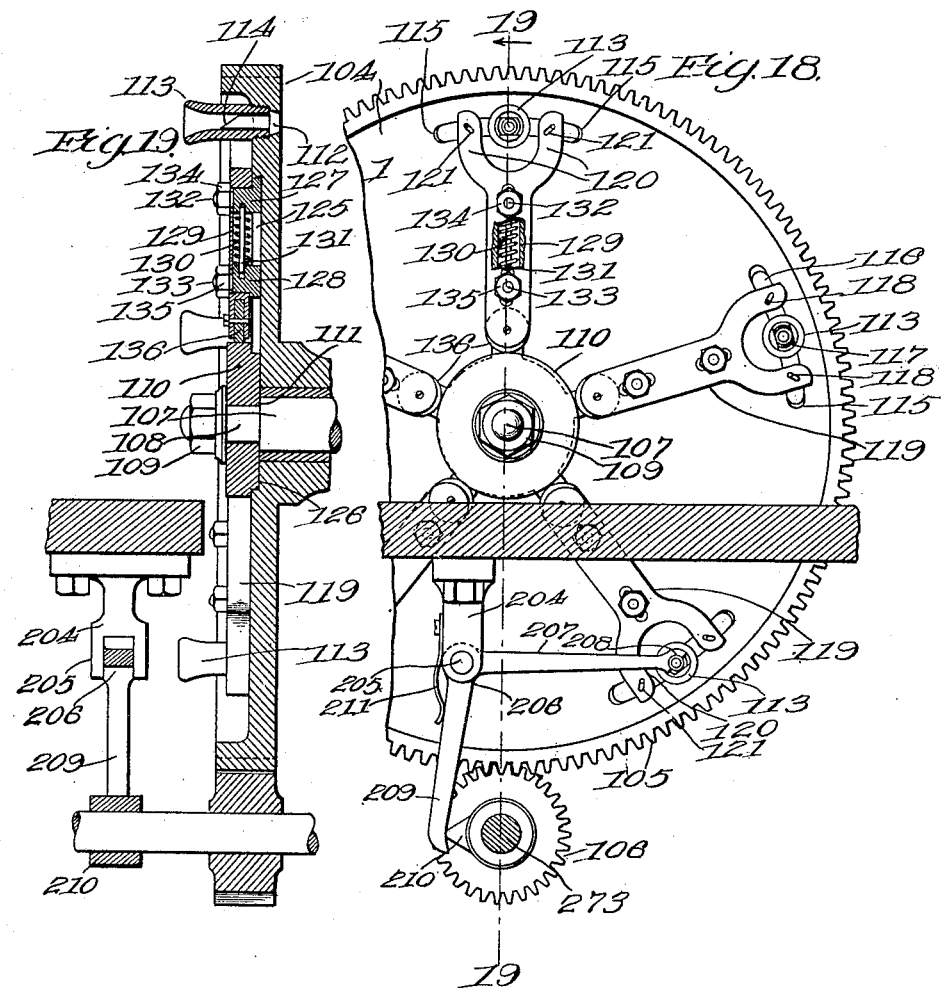

No. 892,099. PATENTED JUNE 30, 1908.
F. TONE.
APPARATUS FOR MANUFACTURING CIGARETTES WITH MOUTHPIECES.
APPLICATION FILED APR. 13, 1906.
15 SHEETS—SHEET 10.
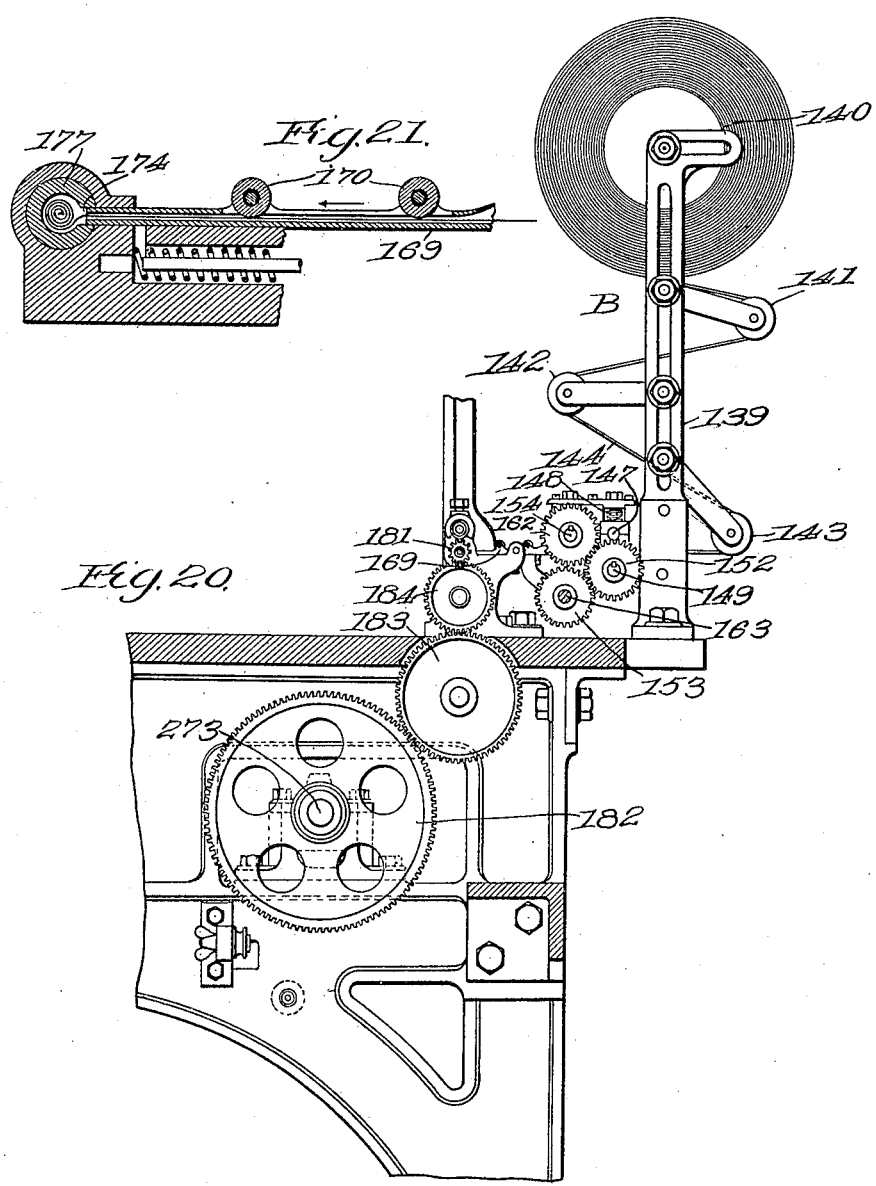
Witnesses:
C. M. Crawford
C. Huymann
Inventor:
Fukutaro Tone
By B. Singer
Atty.

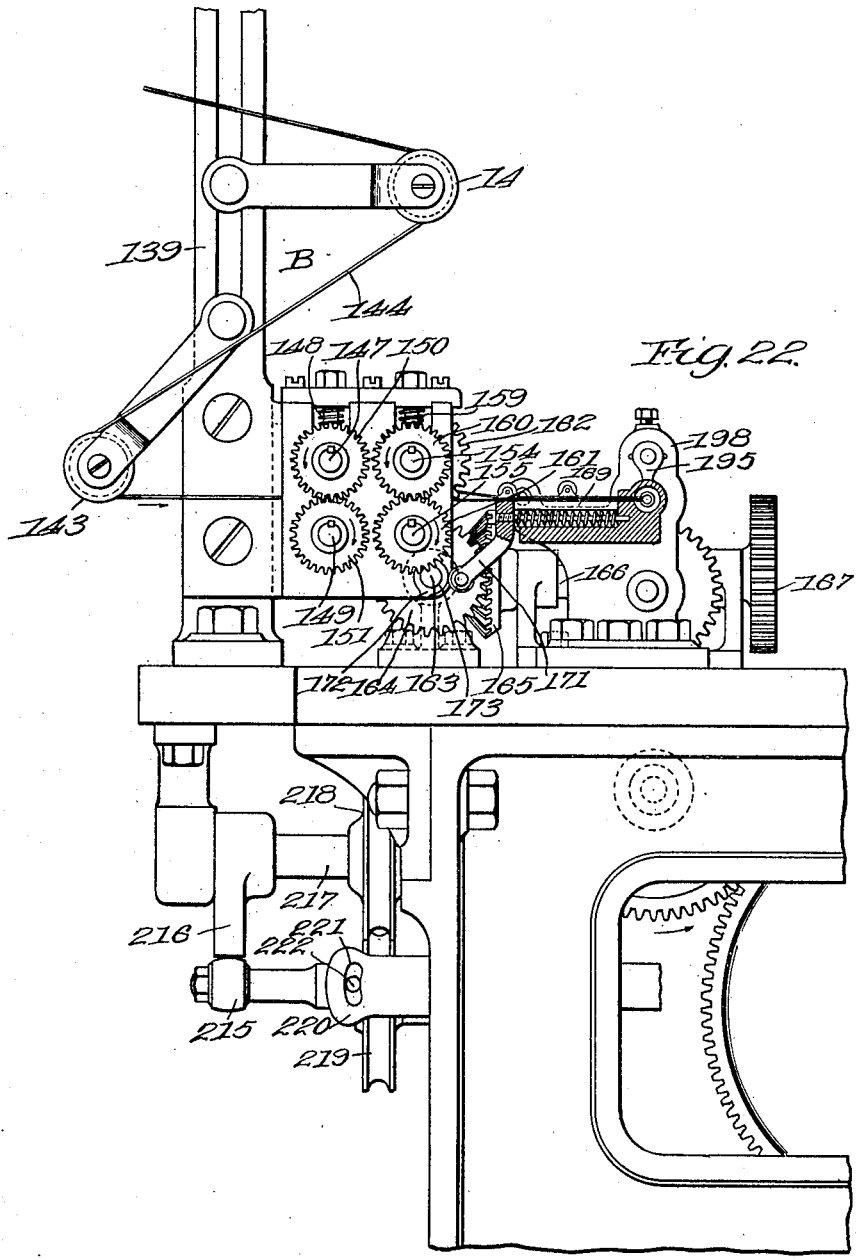

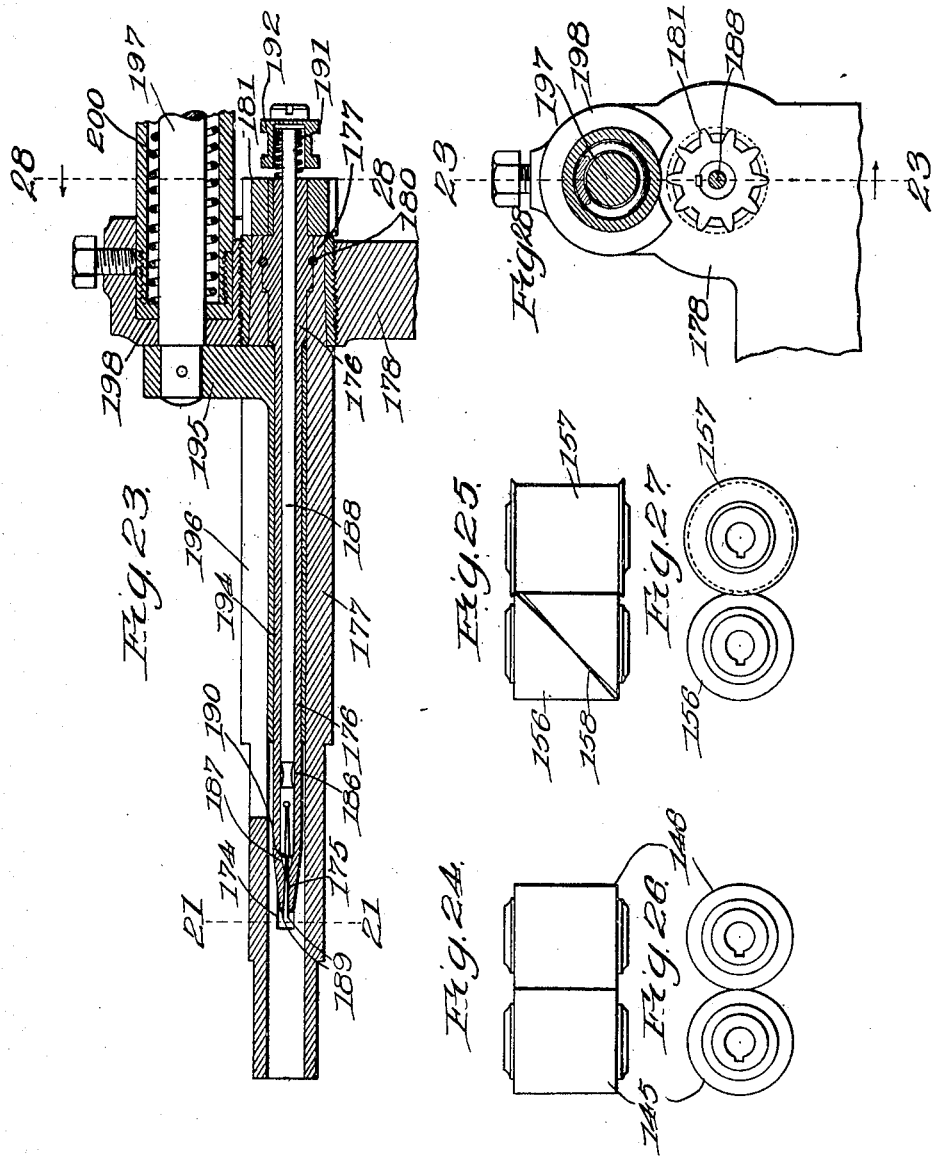

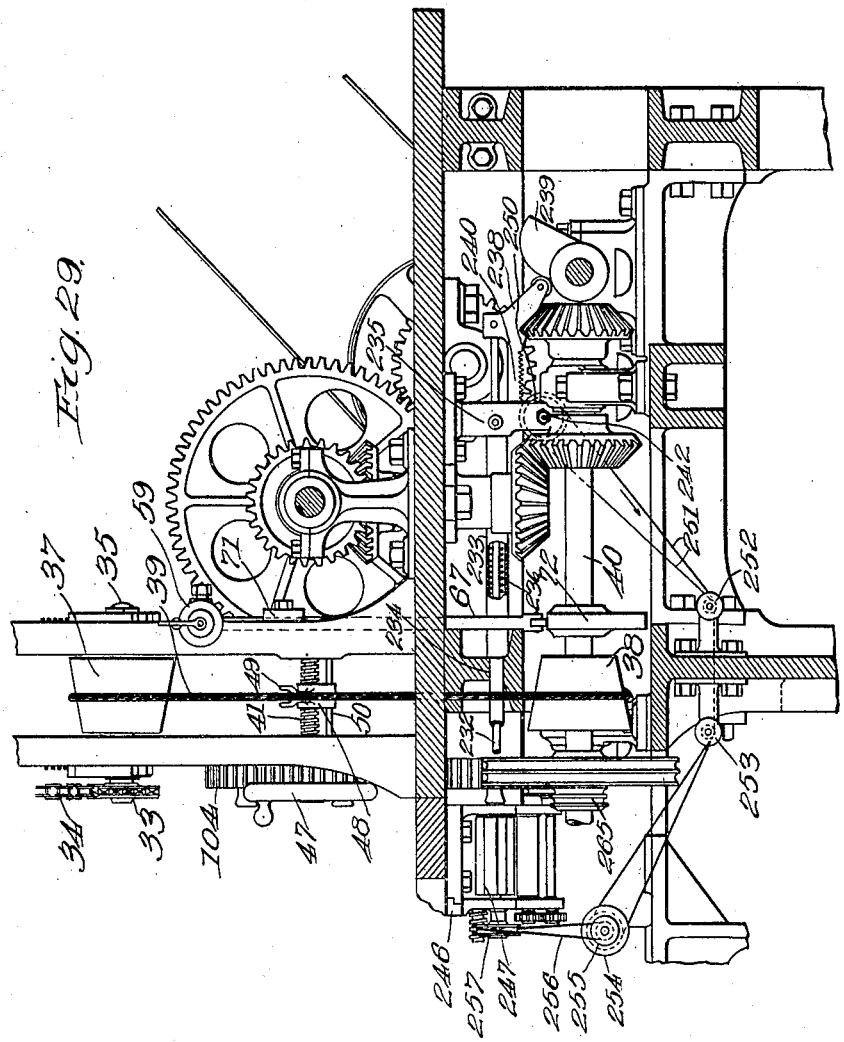

No. 892,099.
PATENTED JUNE 30, 1908.
F. TONE.
APPARATUS FOR MANUFACTURING CIGARETTES WITH MOUTHPIECES.
APPLICATION FILED APR. 13, 1906.
15 SHEETS—SHEET 14.
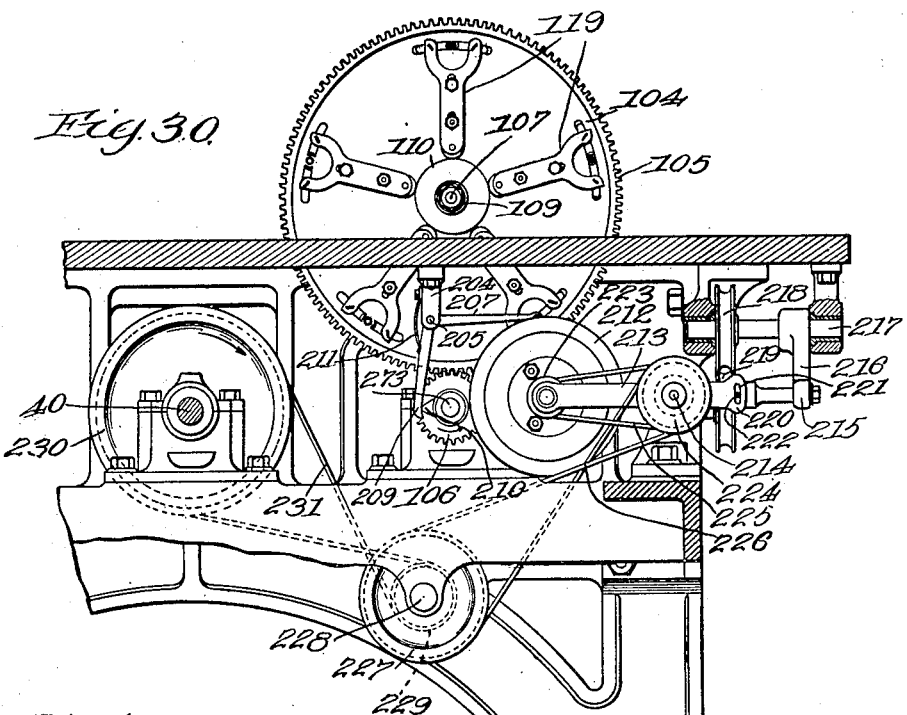
Fig. 30.
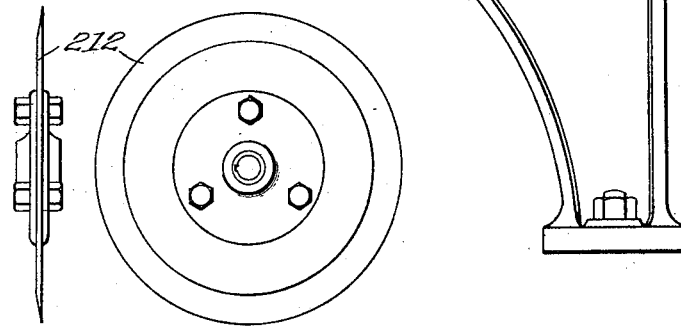
Fig. 31.
Fig. 32.
Witnesses:
C. M. Crawford
C. Heymann
Inventor:
Fukutaro Tone
By B. Singer
Atty.

No. 892,099. PATENTED JUNE 30, 1908.
F. TONE.
APPARATUS FOR MANUFACTURING CIGARETTES WITH MOUTHPIECES.
APPLICATION FILED APR. 13, 1906.
15 SHEETS—SHEET 15.
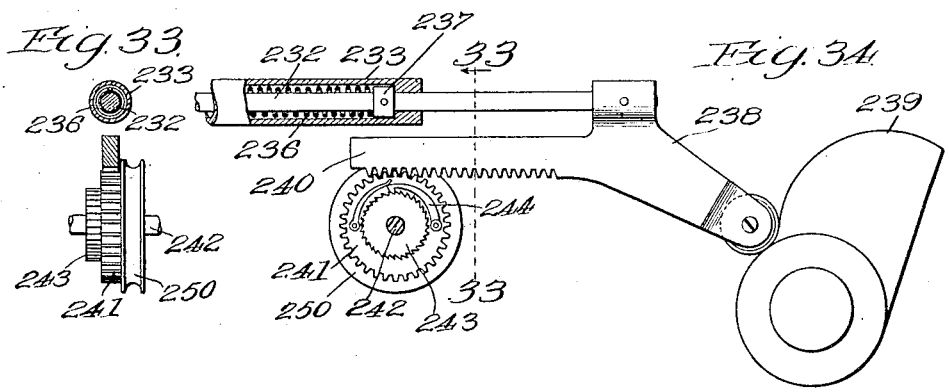
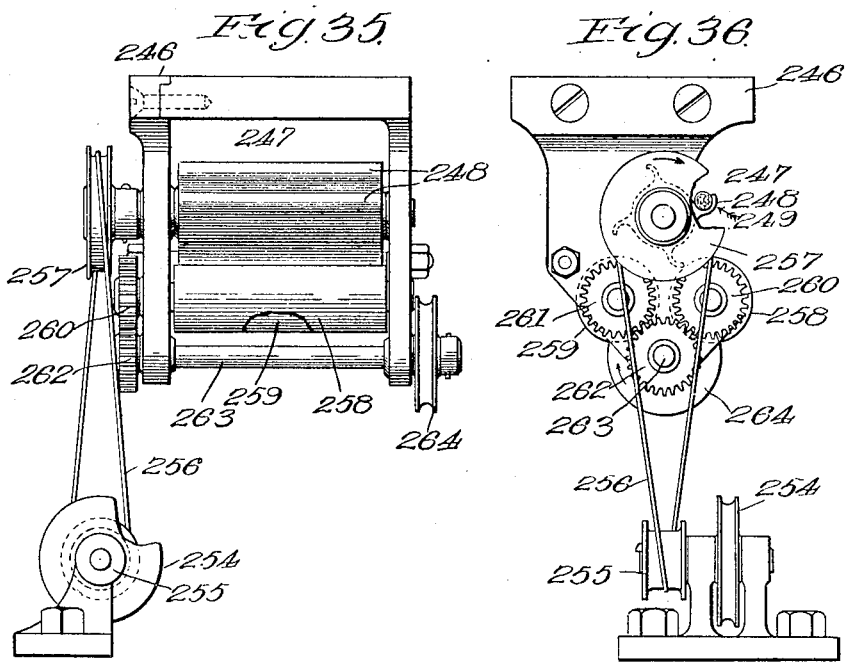
Witnesses:
C. N. Crawford
C. Heymann
Inventor:
Fukutaro Tone
By B. Singer
Atty.

UNITED STATES PATENT OFFICE.

FUKUTARO TONE, OF TOKYO, JAPAN.

APPARATUS FOR MANUFACTURING CIGARETTES WITH MOUTHPIECES.

No. 892,099.   Specification of Letters Patent.   Patented June 30, 1908.

Application filed April 13, 1906. Serial No. 311,518.

*To all whom it may concern:*

Be it known that I, FUKUTARO TONE, a subject of the Emperor of Japan, residing at No. 10 Nishika Machi, Komagome, Hongo, Tokyo, in the Empire of Japan, have invented certain new and useful Improvements in Apparatus for Manufacturing Cigarettes with Mouthpieces, of which the following is a full, clear, and exact specification.

The invention embodies the provision of a make-up device adapted to receive an empty paper wrapper and to coöperate with and carry the wrapper to distinct mechanisms for forming the tobacco into the desired shape of filler together with ejecting mechanism for ejecting the filler from the forming mechanism and thrusting it into the empty wrapper, suitable means being provided for stripping or macerating the tobacco and feeding the same to the forming mechanism. The said make-up device is adapted to carry the filled cigarette wrapper from the forming mechanism to mechanism designed to form mouthpieces and attach the same to the cigarette from which point the latter is carried to a trimming device and from thence to a final ejecting mechanism. Receiving devices are provided for the finished cigarette which are adapted to discharge the same into a rolling device whose function is to loosen the packed contents or filler.

The invention further consists in details of construction which will hereinafter be more fully described in connection with accompanying drawings and will be more particularly pointed out and ascertained in and by the appended claims.

In the drawings:—Figure 1 is a sectional elevational view of a machine embodying the main features of my invention. Fig. 2 is a sectional view on line 2—2 of Fig. 1. Fig. 3 is a sectional view on line 3—3 of Fig. 4. Fig. 4 is a plan view of the make-up device, the forming mechanism and ejecting device therefor, also including the mechanism for making and ejecting the mouthpieces. Fig. 5 is a sectional elevation of means for operating feed rollers constituting a part of my invention taken on line 5—5 of Fig. 8. Fig. 6 is a vertical sectional view of one of the receiving hoppers, one of the feed-hoppers, the feed-rollers therefor and the forming mechanism. Fig. 7 is a sectional view on line 7—7 of Fig. 8. Fig. 8 is a plan view of the feeding rollers and the gears therefor. Fig. 9 is an end elevation of the forming plates mounted on their supports. Fig. 10 is a plan view thereof. Fig. 11 is an enlarged view and front elevation of the lower portion of the receiving hoppers and the upper portion of the feed hopper showing the feed gearing partly in section and partly in elevation. Fig. 12 is a sectional view on line 12—12 of Fig. 11. Fig. 13 is a sectional view on line 13—13 of Fig. 1. Fig. 14, is a view in elevation of one of the details of Fig. 13. Fig. 15 is a view in elevation of the make-up device or carrier. Figs. 16 and 17 are views of gripping devices used in connection with said carrier. Fig. 18 is a view similar to Fig. 15 showing a portion of the trimming device. Fig. 19 is a sectional view on line 19—19 of Fig. 18. Fig. 20 is a rear view partly in section showing mechanism for supplying cutting and forming the mouthpieces. Fig. 21 is a section on line 21—21 of Fig. 23 illustrating the guide through which paper is passed from the reel to the mouthpiece former. Fig. 22 is a view similar to Fig. 20 on a slightly enlarged scale showing the opposite side of the mouthpiece forming mechanism from that shown in Fig. 20. Fig. 23 is a sectional view of the mouthpiece forming and ejecting mechanism taken on line 23—23 of Fig. 28. Figs. 24 and 25 are plan views of feeding and cutting rolls for the mouthpiece paper. Figs. 26 and 27 are end views of said rollers. Fig. 28 is a section on line 28—28 of Fig. 23. Fig. 29 is a longitudinal sectional view of the machine. Fig. 30 is a front section elevation showing the make-up device and the trimming device. Figs. 31 and 32 are edge and side views of the cutting knife. Fig. 33 is a sectional view on line 33—33 of Fig. 34. Fig. 34 is a side elevation partly in section of one end of the final ejecting mechanism. Fig. 35 is a front elevation of the receiving and rolling devices. Fig. 36 is an end view thereof.

Like characters of reference designate similar parts throughout the different figures of the drawings.

This invention comprises as shown a plurality of receiving hoppers 1 and 2, formed in a unitary casing 3, the said casing being divided by partitions 4. At their lower ends the hoppers are contracted and the walls 5 deliver to feeding hoppers 6. The tobacco, prior to being fed to the feed-hoppers 6 is stripped or macerated and in order to effect the stripping operation it is necessary to provide a positive feed in order to cause an effective delivery from the receiving to the feeding hoppers. To this end mechanism is provided which performs the dual function of feeding and stripping the tobacco and in the present construction this mechanism consists of a plurality, preferably two rollers 7, located at the delivery end of the receiving hoppers 6. The walls 5, Fig. 6, desirably extend inwardly beneath the rollers 7 in the stripping operation, this feature being realized by forming stripping extensions 8. In order to insure delivery of the tobacco between the rollers 7 and stripping extensions 8 and to prevent its escape between the rollers 7 the partitions 4 are flared at 9. I will next describe in detail the specific construction of said stripping rollers, reference being had to Figs. 6, 11 and 12 respectively.

The rollers 7 are centrally bored at 10 and are each provided with a plurality of stripping fingers 11 spaced apart from each other and radially disposed in said rollers. Desirably the rollers 7 are provided with a plurality of rows of radially and longitudinally disposed passages or openings 12, each extending from the bore 10 outwardly to the peripheries of said rollers. Said fingers 11 are provided on their inner ends with cam engaging enlargements or heads 13 which fit snugly in the openings 12 and project into the bore 10 when the rollers 7 are in certain positions. In order to afford a bearing for the outer or operative ends of said fingers 11 bearing strips 14 are provided, which preferably extend lengthwise of the rollers in order to accommodate an entire row of fingers, there being shown five fingers in each row, as will be noted by reference to Fig. 12. Desirably said strips 14 are dovetailed into the peripheries of said rollers 7 in order to avoid projecting peripheral surfaces and further in order to provide a structural connection for said strips to throw the lateral strain wholly upon the rollers. Longitudinal displacement of said strips 14 is prevented by means of screws 15, Fig. 12, adapted to pass through said strips and be anchored by threaded engagement with the bodies of said rollers. In order to normally maintain said stripping fingers 11 in non-operating or retracted positions, springs 16 are interposed between the heads 13 and the strips 14, said springs normally tending to force the heads 13 into the bore 10. In operation it is desirable to cause the stripping fingers to project beyond the peripheries of the rollers 7 at points between the flared portions 9 and the extensions 8 in order to engage the tobacco and operate upon the same but after the stripping operation has been completed and the stripping fingers 11 have passed inwardly beyond the extensions 8 it is desirable to retract or withdraw the stripping fingers in order to prevent the tobacco from being carried upwardly and returned to the receiving hopper. In order to successively withdraw and project the rows of stripping fingers from and beyond the peripheries of said rollers 7 cams 17 are employed which, as shown, are rigidly mounted in the bores 10 of said rollers, said cams being, as the rollers are rotated, engaged by the heads 13 of the stripping fingers to perform the function just described. As shown said cams 17 are non-rotatively mounted on cam studs 18 rigidly mounted at 19 to any suitable stationary part. As shown the bores 10 of said rollers 7 are reduced in diameter at 20, Fig. 12, this construction permitting the cam studs to form the inner bearing of the rollers 7 and also afford an engaging surface upon the rollers 7 for the cams 17. The rollers 7 are mounted at their opposite or forward ends on spiders 22 which preferably seat in annular recesses 23 in said rollers, screws 24 serving to lock said spiders and rollers together. Preferably the inner faces of said spiders engage the cams 17 and are also centrally recessed at 25 to form a support for the outer ends of the cam studs 18. As will be noted by reference to Fig. 12 the rollers 7 are of sufficient length to extend throughout the depth of the hoppers 2 and it will be further noted that the manner in which the operative and non-movable parts are assembled affords a very convenient and effective mounting for the same. The spiders 22 are provided with shanks or stud shafts 26 which are journaled in bearings 27, the shafts carrying on their outer ends gears 28 and 29. Said gears 28 and 29, as shown in Fig. 11 mesh and when operated cause the rollers 7 to revolve in opposite directions as indicated by the arrows in Figs. 6 and 11. The gear wheels 28 of each pair of stripping rollers mesh with pinions 30 mounted on shafts 31. Said pinions 30 are provided with sleeve extensions on which are mounted the sprocket wheels 32.

In order to impart an equal speed to the rollers of each receiving hopper and thereby effect uniform discharge from the same the sprocket wheels 32 are driven from a single source of power which, as shown, comprises a sprocket wheel 33. A sprocket chain 34 is trained about said wheels 32 and 33.

I will next describe the manner in which power is applied to the sprocket wheel 33 to drive the stripping rollers. It will be obvious that it is not only desirable to drive both pairs of stripping rollers at the same speed to obtain the uniform discharge from all the receiving hoppers as hereinbefore described but further it will be necessary to regulate the discharge from said hoppers to correspond with the receiving capacity of other parts of the mechanism and to this end means are provided for operatively connecting the sprocket wheel 33 with a driving mechanism in such a manner as to permit any desired adjustment of speed of the stripping rollers.

By reference to Figs. 13 and 29 it will be seen that the sprocket wheel 33 is mounted upon a shaft 35. Said shaft 35 is journaled in bearings 36 and carries a cone pulley 37 which, as shown in Fig. 29 is reversely disposed with respect to a pulley 38. A transmission rope or cable 29 is trained about said cone pulleys and serves to transmit power from shaft 40 to shaft 35. Means are provided for shifting the rope 39 upon said pulleys to vary the speed of the stripping rollers which means consists, as shown, of a threaded shaft 41 mounted in bearings 42 and 43. The bearing 43, Fig. 13 is equal in diameter to the threaded portion of the shaft 41 and the latter is prevented from moving longitudinally by a set bolt 44 having threaded engagement with the bearing 43 and being provided with a reduced shank 45 engaging an annular recess 46 in the shaft 41. Said set bolt when withdrawn permits the shaft 41 to be removed from its bearing endwise and when turned down as shown in Fig. 13 it serves to lock said shaft in an adjusted position. The shaft 41 is rotated by means of a hand wheel 47 to obtain any desired adjustment of the rope 39. An adjusting nut 48 is mounted on said shaft 41 and is adjusted laterally by the rotation of the latter, said nut being provided with U-shaped projections 49 adapted to loosely engage said rope. In order to prevent rotation of the nut 48 the latter is slidably connected with a bolt 50 mounted in the bearings 42 and 43. In order to provide for the usual tension of the rope 39 the bearings 36 are adjustably mounted by means of threaded rods 51 provided with heads 52 adapted to be operated with wrench rods. The threaded rods 51 pass through and have threaded engagement with supports 53 and the bearings 36 are held in place laterally by ways 54.

After the tobacco has been stripped and delivered by the stripping mechanism to feed-hoppers 6, there being two in number, one for each pair of receiving hoppers 1 and 2. At their delivery ends said hoppers 6 are each provided with a pair of feed rollers 55, the peripheries of which are made of rubber or material of like character, Figs. 6, 7 and 8. The shaft of one of said rollers is provided with a loosely mounted gear wheel 56 and a ratchet wheel 57 which latter is rigidly mounted. The gear wheel 56 carries a spring actuated ratchet pawl 58. The ratchet wheel 57 and pawl 58 serve, when power is applied to wheel 56 in the direction of the arrow shown in Fig. 5 to rotate said feed rollers 55 in a feeding direction. When power is applied in an opposite direction to wheel 56 the ratchet pawl 58 slides freely over the ratchet wheel 57 and serves to prevent a non-feeding or reverse rotation of the rollers. 55.

In order to provide for a uniform delivery from each of the feed-hoppers means are provided for operating the delivery rollers of said hoppers in unison and preferably said means are operated from the same source of power as the stripping rollers, thereby enabling the operator to obtain a very accurate adjustment of operation between the same. As shown and referring more specifically to Figs. 5 and 6, 59 designates bearing sleeves preferably located in alined relation with respect to their longitudinal axes and rigidly mounted to any suitable stationary part. Said sleeves are bored at a uniform diameter and are reduced at their inner ends at 60. At their outer ends bearing nuts 61 are fixed in the ends of the bore 59, Fig. 5 by threaded engagement therewith and reciprocating plungers 62 are mounted in said sleeves and find bearing in reduced ends 60 and the nuts 61. Collars 63 are secured to said plungers and springs 64 are interposed between the nuts 61 and collars 63 to normally retain the plungers in the position shown in Fig. 5. Rack bars 65 mounted on the outer ends of said plungers mesh with wheels 56 and operate the same and therethrough the delivery rollers 55 in the manner hereinbefore described. Said plungers at their inner ends are provided with rollers 66 adapted to be engaged by a reciprocating rod 67 in a manner to cause said plungers to travel outwardly in opposite directions. To this end the rod 67 is provided with diverging cam or actuating faces 68 adapted to engage said rollers 66. In order to vary the extent of rotation imparted to the delivery rollers 55 an adjusting means is provided which, as shown, consists of the following parts. The rack bars 65 are provided with lugs 69, Fig. 5 and the sleeves 59 are provided with adjusting screws 70. It will be obvious by reference to Fig. 5 that when the adjusting screws are turned to the right so as to limit the retractive movement of the plungers the inclined surfaces 68 will not engage the rollers 66 immediately upon an upward reciprocation of the rod 67 and thereby a slight lost motion will occur, on the other hand, if the screws 70 are in the position shown in Fig. 5 a maximum retractive movement of the plungers will be permitted thereby causing a greater outward or forward movement of the same. The rod 67 is vertically mounted in guides 71 adapted for engagement with a cam 72 mounted on shaft 40. It will be obvious that when the cam 72 reciprocates the rod 67 upwardly the plungers 62 will be thrust outwardly and will effect a slight rotating or feeding movement of the delivery rollers 55, the springs 64 serving to retract the plungers to initial positions when the rod 67 is lowered.

After the tobacco has been discharged from the feeding hopper it falls by gravity upon mechanism designed to form the tobacco into a cylindrical or rod like shape so that it can be inserted in the cigarette wrapper. I will now describe in detail the forming mechanism designed to perform this function, reference being had to Figs. 3, 4, 6, 9 and 10.

75 designates standards provided at their upper ends with lugs 73 to which feed hoppers 6 are secured by means of bolts 74. Each standard 75 is longitudinally recessed at its upper end to receive forming mechanism which as shown consists of two forming plate supports 76. Said supports 76 have a dove-tailed mounting as shown at 77 upon the standard 75 permitting said supports to be reciprocated in opposite directions. The forming plates 78 are rigidly secured to their supports by means of bolts 79 as clearly shown in Figs. 6, 9 and 10, and are provided with recessed coöperating marginal forming portions 80 which serve when the plates are in a closed position to provide a forming cavity 81 of a size equal to the tobacco to be shaped. In order to retain the tobacco delivered by the rollers 55 in proximity to the recessed portions 80 when the forming plates are separated I desirably provide retaining means for one of the plates 78 on its under side with a retaining plate 82 which is adapted to project beyond the forming plate to which it is secured and beneath the coöperating forming plate a sufficient distance to form a receiving or retaining shelf for the tobacco when the forming plates 78 are in a separated or a non-forming position.

I will next describe the means whereby the forming plates are reciprocated into and out of forming positions reference being had to Figs. 3 and 4.

83 designates plate operating levers which as shown are pivotally mounted at 84 upon the standard 75. The outer ends of said levers are pivotally connected at 85 to the plate supports 76 and their inner free ends are adapted to engage cams 86. When said cams are in the position shown in Fig. 4 the plates 78 are in a forming position and when the reduced portions of said cams are adjacent the outer ends of said levers the latter move inwardly and open the forming plates 78. Suitable springs or like means such as 87 serve to retain the free ends of said levers 83 in engagement with said cams. Said cams 86 are mounted upon a counter shaft 88 provided with a gear wheel 89 which meshes with a pinion 90 upon the main driving shaft A. One of the cams is provided with a pinion 91 meshing with a pinion 92 which in turn drives a pinion 93. Said pinion 93 is mounted on a shaft 94 carrying a cam 95. A cam bar 96 mounted in suitable bearings is adapted to be reciprocated in one direction by cam 95 and is provided with rack teeth 97 adapted to engage mechanism for retracting said bar to its initial position and maintaining it in constant engagement with cam 95 which mechanism consists of the following parts. A hollow gear wheel 98 meshes with the rack teeth 97 and is provided with a spring 99 one end of which is secured to said pinion 98 and the other end of which is secured to the shaft 100 of said pinion and on which the latter is loosely mounted. A ratchet wheel 101 is rigidly mounted on said shaft and is capable of being locked in any desired position by a spring actuated locking dog 102. From the foregoing it will be understood that when the rack bar 96 is reciprocated toward the forming plates the spring 99 will be wound up and will act to restore the rack bar 96 to a normal position when the same is released by the cam 95. The function of this mechanism is to eject the tobacco formed in the cavity 81 of the forming plates and to this end an ejecting rod 103 is mounted on the outer end of the rack bar 96 in alinement with the cavity 81 in a manner to project into said cavity and eject the tobacco therefrom.

The mechanism for receiving the formed tobacco shaped by the forming plates constitutes broadly in connection with its coöperating mechanism a make-up device carrying device, of which there are two in number. As shown and referring more particularly to Figs. 15, 16, 17, 18, 19 and 31 this make-up carrying device consists of a rotary member which in the most specific embodiment shown is in the form of a gear wheel 104. Said gear wheel is provided with gear teeth 105 adapted to mesh with and be driven by a pinion 106. Said gear wheel 104 is loosely mounted on a non-rotatable shaft 107 reduced at its outer end at 108 and provided with a lock nut 109. A cam 110 mounted on the reduced end 108 is clamped rigidly to said shaft by means of the nut 109 against a shoulder 111. The body of the wheel is provided with five receiving apertures 112 all of which are disposed at an equal radial distance from said shaft 107 and an equal circumferential distance from each other. Each of said apertures 112 is provided with a cigarette holding member in the form of an outwardly flaring tube 113 which as shown are secured in said openings 112 by threaded engagement therewith. Said holders 113 are provided on opposite sides and at points one side of the body of the wheel with openings 114 adapted to receive cigarette gripping devices which will now be described in detail. Circumferentially disposed recesses 115 are formed in the body of the wheel and extend laterally in opposite directions from said tubes 113 and serve to receive slidably operating gripping members 116 shown in detail in Figs. 16 and 17. Each of said members comprises a body portion adapted to seat in said recesses, a gripping portion 117 and an operating pin 118. The means for operating said gripping devices consist as shown of a plurality of radially disposed arms, five in number, each of which is movable in the direction of its length. Said arms are indicated as a whole by 119 and are provided on their outer ends with forked arms or extensions 120 each of said forked arms having outwardly diverging angularly disposed slots 121 adapted to receive said pins 118. The slidable connection described serves when the arms 119 are moved outwardly to contract said gripping devices from the position shown in Fig. 15 at 122 to the position shown at 123 and likewise an inward movement of the arms 119 serves to expand said devices from the position shown at 123 to the position shown at 124. When said gripping devices are contracted their gripping members 117 gently engage the wrapper or the completed cigarette thereof with a sufficient pressure to retain the same in place and when said gripping devices are expanded the completed cigarette is free to be discharged. Cam 110 performs the function of operating the several arms 119 to effect the different desired adjustment of the gripping devices at different points in the rotation of the wheel.

I will next describe the specific construction of the arms 119 to illustrate the manner in which they are mounted on the body of the wheel 104 to permit operation by the cam 110 in the manner just described. See Figs. 18 and 19.

The wheel 104 is provided with a plurality of radially disposed recesses 125 extending outwardly from a centrally disposed annular recess 126 in which the cam 110 is seated. Blocks 127 and 128 are slidably mounted in said slots 125 and project outwardly therefrom into recesses 129 formed in the arms 119. Springs 130 preferably disposed about pins 131, mounted at their opposite ends in the blocks serve to retain the latter in their extreme outermost positions. Said blocks 127 and 128 are each provided with threaded studs 132 and 133 which project through longitudinally disposed slots in the arms 119 and carry on their outer ends nuts 134 and 135 by means of which said arms are held in slidable engagement with said wheel. Preferably the blocks 127 and 128 and the slots 125 are dove-tailed in cross section to form a retaining connection. Rollers 136 are carried on the inner ends of said arms 119 and engage the periphery of the cam 110.

A brief description of the operation of the construction just described may facilitate an understanding of the operation of the entire machine prior to the completed description thereof. Referring to Fig. 15 a completed wrapper is inserted into 113 at point 122 wherein the gripping devices are shown in an expanded position. It may be assumed for clearness that empty wrappers are inserted by hand as I desire to use any one of the well known wrapper making machines and therefore this feature forms no part of the present invention and need not be shown or described. The empty wrapper is loosely supported in the tube until it approaches point 123 wherein it will be seen that the roller 136 engages a higher portion of a cam 110 which operated to contract the gripping devices and gently grasp the empty wrapper and hold it in axial alinement with the tube 113. When said tube finally reaches point 123 it is located in axial alinement with the forming plates 78, or more correctly speaking the cavity 81 thereof, and is in a position to receive the formed tobacco ejected from said cavity by means of ejecting rod 103 hereinbefore described which forces the tobacco into the empty wrapper. Assuming that the wrapper has been filled, the wheel 104 continues to rotate to point 137. It will be noted that the cam 110 is formed in a manner to retain the gripping devices in the same position occupied at point 123. At 137 the filled cigarette is in registering proximity to a device for making and inserting the mouthpiece of the cigarette which device will presently be described in detail. Assuming that the mouthpiece had been inserted the wheel 104 continues its rotative movement until it reaches point 138 whereupon the outer end of the completed cigarette is trimmed off by trimming mechanism which will be described in detail subsequent to the detailed description of the mouthpiece mechanism. It will be noted at point 138 that the cams 110 continue to maintain the gripping devices in engagement with the completed cigarette to securely hold the same while the outer end is trimmed. The wheel 104 continues its rotation to point 124 where the cigarette is brought in registering proximity with mechanism which ejects the cigarette from the wheel 104 into suitable receiving apparatus which will be hereinafter described in detail.

The mechanism for supplying and cutting the paper forming the mouthpiece will now be described in detail general reference being made to Figs. 1, and 2 and specific reference being made to Figs. 4, 20, 21, 22, 23, 24, 25, 26, 27 and 28. Said mechanism is designated as a whole by B and is located at the extreme lateral sides of the machine as will be noted by reference to Fig. 1. A standard 139 supports a reel 140 together with a plurality of adjustably mounted idlers 141, 142 and 143 over which a strip of paper 144 of which the mouthpieces are formed, is trained from its passage from the reel 140 to the mechanism for cutting and forming said mouthpieces which will now be described in detail. From the idler 143 the paper 144 is received by a pair of feeding rollers 145 and 146 mounted on shafts 147 and 149 and by spring 148 to maintain the roller 145 in close frictional engagement with the roller 146. Said shafts 147 and 149 carry meshing roller operating gears 150 and 151. On its opposite end said shaft 149 carries a roller driving pinion 152 in mesh with and driven by a pinion 153. Shafts 154 and 155 carry a pair of rollers 156 and 157, the former being provided with a diagonally disposed knife 158 adapted to cut the paper on the bias. Shaft 154 is mounted in adjustable bearing engaged by spring 159 which serves to maintain said rollers 156 and 157 in close frictional engagement. The cutting roller operating gears 160 and 161 are mounted on said shafts 154 and 155 and serve, when power is applied, to drive said rollers 156 and 157 in opposite directions and in the same general directions as the rollers 145 and 146 are driven. Shaft 154 carries on its opposite end a pinion 162 which meshes with pinion 152. It will be obvious from the foregoing that when power is applied to pinion 153 the latter serves through the foregoing trains of gears to operate the feeding and cutting rollers in the manner just described. Pinion 153 is mounted upon a shaft 163 which carries on its outer end a miter 164 adapted to mesh with a miter 165 on shaft 166. Shaft 166 carries a pinion 167 meshing with a pinion 168 which is mounted on shaft 88 the latter being operated in a manner hereinbefore described in connection with mechanism shown in Fig. 4.

The paper passing between the feeding rollers and cutting rollers is cut in prescribed lengths and is discharged onto a guide 169, Figs. 21 and 22. Said guide is provided with rollers 170. The guide 169 is provided with an arm 171 Fig. 22 adapted for engagement with a cam projection 172 on a cam 173 mounted on a shaft 163. This mechanism imparts a sufficient movement of the guide 169 toward an opening 174 to cause the end of the paper to project into a former 176 to be hereinafter more fully described. The paper is discharged from said guide to a mouthpiece forming mechanism which will now be described in detail.

A former tube 177, Figs. 2, 4, 21 and 23 is rigidly mounted at one end in a support 178 and at its opposite or delivery end in a support 179. At its delivery end said tube is in a position to register with any one of the several cigarette holders 113 when the same reach point 137. The guide 169 projects into a slot or opening 174 in the former tube 177. A mouthpiece former 176 is rotatively and non-slidably mounted in the former tube 177, the rear end of said former engaging said tube to prevent its longitudinal displacement by means of a ring 180 which seats in complementally formed registering annular recesses in the tube 177 and former 176 as clearly shown in Fig. 23. The former 176 carries on its outer end a gear pinion 181 driven by a train of gears consisting of pinions 182, 183 and 184 as will be seen by reference to Fig. 20, the gear wheel 182 being mounted upon countershaft 273. At its opposite end said former 176 is contracted and slotted at 175 at a point adjacent the opening 174 and in such a manner as to receive the paper discharged from the guide 169 into said opening 174. The contracted or slotted portion 175 terminates in a cylindrical bore 136 having cam surfaces 187 connecting said cylindrical and slotted portions. A paper retaining device is mounted in said former for the purpose of gripping or retaining the paper during the process of forming the same into a mouthpiece and subsequently releasing the formed mouthpiece to permit its ejection, by mechanism about to be described, from the forming tube into the cigarette holder 113. Said retaining device consists of a rod 188 revolubly and slidably mounted in the former 176 and provided at its outer end with gripping fingers 189. Said gripping fingers are preferably in the form of a strip of spring metal bent upon itself, as shown in Fig. 23 and adapted to be seated in the slotted end of said device 188. The slotted end of said device comprises jaws having cam surfaces or bends 190 adapted to engage cam surfaces 187 of the former. When the paper is first introduced into the slotted end 175 the retaining device 188 is retracted to withdraw the gripping fingers 189 from the slot 175. After the paper is inserted in said slot the retaining device 188 is thrust forwardly as shown in Fig. 23 in a manner to straddle the paper, the complete forward movement of said retaining device serving through the engagement of ends 190 and the cam surfaces 187 to contract the gripping fingers and hold the paper tightly in place. Rotative movement is then imparted through pinion 181 to the former 176 and the paper is wound about said former in the manner shown in Fig. 21 until the mouthpiece is completed. In the meantime the retaining device will have released the paper.

I will now describe the means for longitudinally reciprocating the retaining device to grip and release the paper.

A spring 191 normally holds the retaining device 188 in a retracted position. As shown in Figs. 2 and 4 the retaining device carries a cam arm 192 adapted to be engaged by a cam 193 mounted on shaft 166. By means of the foregoing arrangement the retaining device is reciprocated forwardly to cause the fingers 189 to grasp the end of the paper inserted through the opening 174 from which the mouthpiece is made, the return or rearward reciprocation being effected by spring 191. After the mouthpiece is formed means are provided for engaging the same to eject it from the former tube 177 into one of the holding members 113 which occupies the position designated by 137 of Fig. 15. The mouthpiece is or may be formed of such diameter with respect to the cigarette wrapper as to telescope the same inwardly or outwardly. The mechanism, Fig. 23, for performing this function consists of an ejector, preferably in the form of a sleeve 194 which is slidably mounted in the former tube 177 and upon the former 176. Said ejector carries an arm 195 which is accommodated by a slot 196 and projects upwardly therethrough and is secured to an ejector operating rod 197. The rod 197 is mounted in a bearing 198 at one end and at its other end it finds a bearing in a contracted portion of the sleeve 199 as clearly shown in Fig. 4. A spring 200 is interposed between one end of said sleeve and a collar 201 mounted on said rod to normally hold the ejector in the position shown in Fig. 23. Said rod 197 carries on its outer end a cam arm 202 adapted for engagement with a cam 203. After the mouthpiece is formed the cam 203 operates the ejector to thrust the mouthpiece into the cigarette holder 113 in the manner previously described.

The cigarette which is now contained in holder 113 at point 137 is filled with tobacco and is provided with a mouthpiece but it is necessary to trim the outer end of the cigarette to remove the straggly ends of tobacco projecting therefrom. To effect the trimming operation the make-up carrying device or wheel 104 is rotated to bring the partially completed cigarette to point 138.

The trimming device will now be described in detail reference being had to Figs. 18, 19, 22, 30, 31 and 32.

Upon a bracket 204 and at 205 is mounted a bell crank lever 206 having an arm 207 provided with an engaging or trimming member 208 adapted to engage a portion of the periphery of one end of the cigarette to hold the same while it is being trimmed. The other arm 209 is adapted to be engaged by a cam 210 mounted on shaft 273 whose function it is to rock the bell crank lever in a manner to bring the engaging or trimming member 208 into engagement with the cigarette after the latter has been moved by the make-up device to a position shown at 138. It will be noted that cam 110 still holds the arm 119 in a manner to retain the gripping devices 116 in engagement with the cigarette so as to securely hold the same while it is being trimmed. A spring 211 normally retains the bell crank lever in a non-operating position in order to permit the cigarette to reach point 138. The outer end of the cigarette is preferably trimmed by a knife and as shown the knife is in the form of a disk 212 which is continually rotated and movably mounted so that it can be thrust into cutting proximity to the cigarette to trim the same. As shown in Fig. 30 said disk 212 is mounted at one end of an arm or lever 213 which is pivotally mounted at 214 to a suitable stationary part of the structure. The outer end of said arm is provided with a roller 215 adapted to be engaged by a cam arm 216 mounted on a shaft 217. The shaft 217 carries a pulley 218 disposed above a pulley 219 which pulleys may be operated by a transmission rope not herein shown to drive cam 216. A stationary arm 220 is slotted at 221 and the rocking movement of the arm 213 is limited by a pin 222 which projects into said slot. A belt pulley 223 rigid with the disk 212 and a belt pulley 224 mounted at 214 carry a belt 225. Said pulley 224 is driven by a belt 226 from a pulley 227 of greater diameter than the pulley 224 The shaft 228 on which the pulley 227 is mounted also carries a pulley 229 smaller in diameter than the pulley 227 which is driven from a pulley 230 by a belt 231. By means of the foregoing arrangement the knife disk 212 is continuously rotated at a very high speed and is intermittently thrust toward and across the axial planes of the cigarettes when the same are brought to point 138. As shown in Fig. 1, two cutting disks are provided to correspond with the double arrangement of other parts of the mechanism which have been singly described, the pulley 230 serving to drive both knives.

After the cigarette has been trimmed the make-up device is rotated to bring the cigarette to point 124 at which point the finished cigarette is ejected into suitable receiving apparatus. It will be noted that at point 124 the cam 110 permits arm 119 to retract under the influence of spring 129 to the initial position as shown at 122 so that the gripping device will release the cigarette and permit the same to be ejected into receiving apparatus. I will now describe in detail the ejecting apparatus for finally ejecting the finished cigarette from the make-up device.

232, Figs. 29, 33 and 34, designates an ejecting rod which is slidably mounted in a casing 233. Said casing 233 is mounted at one end at 234 Fig. 29, and at its other end in a hanger 235. A spring 236 is interposed between the contracted end of said casing and a collar 237 secured on said rod. At its inner end said rod 232 is secured to a cam arm 238 which is operated by a cam 239, Fig. 34. Said cam arm 238 is provided with a forwardly projecting rack bar extension 240 which engages and drives a pinion 241 loosely mounted on shaft 242. Said shaft also carries a rigidly mounted ratchet wheel 243 and the pinion 241 carries a spring actuated ratchet pawl 244. According to this arrangement when the ejecting rod 232 is reciprocated to the left, referring to Fig. 34, to eject the cigarette, the pawl 244 rides loosely over the ratchet 243 and imparts no rotary movement to the shaft 242. Upon the return movement of the rod 232 under the influence of the spring 236 the ratchet pawl 244 engages the ratchet wheel 243 and rotates the shaft 242. This shaft 242 drives the receiving mechanism into which the finished cigarette is deposited.

I will next describe in detail the construction of the receiving mechanism reference being had to Figs. 29, 35 and 36.

A bracket 246 supports a receiving device 247 which as shown consists of a roller provided with a plurality of cigarette receiving ledges 248. The disposition of this receiving device with respect to the make-up device is such that when anyone of the ledges are in a position shown at 249 Fig. 36, it will be in longitudinal alinement with anyone of the cigarette holders 113 when the same are at point 124. Furthermore and as will be noted in Fig. 35 the receiving device is located in such proximity to the make-up device that when the final ejecting rod 232 pushes the cigarette out of its holder the same will fall directly into one of the several ledges which happen to be in the position shown at 249. The receiving device 247 is operated or rotated a quarter of a turn by the return stroke of the final ejecting rod 232 which return movement takes place immediately after a cigarette has been ejected. Said receiving device is driven by shaft 242 in the following manner.

A pulley 250 carries one loop end of a belt 251 which is trained downwardly over rollers 252 and 253 and at its opposite loop end, over a pulley 254. A pulley 255 rigidly mounted on the shaft or pulley 254 carries one loop end of a belt 256 the other loop end of which is trained about a pulley 257 mounted on the shaft of the receiving device 241. From the foregoing the operation of driving the receiving device from the final ejecting mechanism will be obvious.

It is well known that in machine made cigarettes the tobacco is often packed so closely as to prevent a free and easy "draw" and to this end it is desirable to roll the cigarette by means of oppositely acting members in order to loosen the tobacco and obtain an easy "draw." To this end there is provided a rolling device in receiving proximity to the roller 247 which I will now describe in detail.

Preferably the rolling device is mounted on the bracket 246 and consists of two rollers 258 and 259 which as shown are spaced apart a distance slightly less than the diameter of the cigarette. Said rollers are, as shown in Fig. 36, disposed in parallel relation and immediately below the roller 247 and are driven in the same direction by means of the following construction.

Gears 260 and 261 mounted on the shafts of rollers 258 and 259 mesh with the gear 262 mounted on shaft 263. Said shaft carries on its outer end a pulley 264 adapted to be driven from a pulley 265, Fig. 29 on shaft 40 by a transmission rope or the like.

When the cigarette is deposited upon the rollers 258 and 259 by the receiving device it will be prevented from immediately passing between said rollers by reason of the fact that they are spaced apart a distance slightly less than the diameter of the cigarette as hereinbefore explained. It will be understood that while the rollers 258 and 259 are rotated in the same direction their adjacent surfaces will act in opposite directions upon a cigarette which is deposited between said rollers and therefore said rollers constitute oppositely acting members or mechanism for rolling the cigarette. Inasmuch as the cigarette will encounter two oppositely acting adjacent surfaces of the rollers traveling at an equal speed and in the same direction the cigarette will remain between the rollers until the action thereof upon the cigarette has reduced the diameter of the latter or has loosened the contents thereof whereupon the cigarette will pass downwardly between the rollers to a suitable receiver not shown. It will be obvious that the rollers will not always act upon the cigarettes in the same manner, some cigarettes passing through more quickly than others, but it will be impossible for any of the cigarettes to pass between the rollers without having its contents loosened to a certain extent. If there is any tendency on the part of the first cigarette to remain between the rollers instead of passing beyond and through the same the cigarettes subsequently fed will by their weight force the first cigarette between the rollers so that each will be momentarily acted upon by said rollers before being discharged therefrom.

I claim:—

1. A cigarette making machine comprising in combination, a rotatable make-up device provided with a plurality of receivers or holders for the empty wrappers, a gripping device associated with each holder, mechanism for filling said wrappers with tobacco, means for moving said make-up device to bring said holders and wrappers into operative relation with said mechanism, and means for bringing said gripping devices into engagement with said wrappers when the holders are in operative relation with said mechanisms.

2. A cigarette making machine comprising in combination, a movable make-up device provided with a plurality of receivers or holders for the empty wrappers, a gripping device associated with each holder, mechanism for filling said wrappers with tobacco, means for forming and inserting a mouthpiece, means for moving said holders progressively in operative relation with said filling and mouthpiece means, and means for bringing said gripping devices into engagement with said wrappers while said holders and wrappers are in operative relation with said means and mechanism.

3. A cigarette making machine comprising in combination, a movable make-up device provided with a plurality of receivers or holders for empty wrappers, a gripping device associated with each holder, mechanism for filling said wrapper with tobacco, final ejecting mechanism, means for bringing said holders progressively into operative relation with said mechanisms, and means for bringing said gripping devices into engagement with said wrappers while the holders and wrappers are in operative relation with said filling mechanism, said means serving to release engagement of the gripping devices with the wrappers when the same are in operative relation with said ejecting mechanism.

4. A cigarette making machine comprising in combination, a movable make-up device provided with a receiver or holder for an empty wrapper, a gripping device associated with said holder, mechanism for filling said wrapper with tobacco, mechanism for forming and inserting the mouthpiece, trimming mechanism, final ejecting mechanism, means for progressively bringing said holder and wrapper into operative relation with said mechanisms, and means for bringing said gripping device into and retaining engagement with the wrapper when the holder is in operative relation with said tobacco filling mouthpiece forming and trimming mechanisms, said means serving to release engagement of the gripping device with the wrapper when the same is in operative relation with the ejecting mechanism.

5. A cigarette making machine comprising in combination, a circular make-up device provided with a plurality of receivers or holders for the empty wrappers, a gripping device associated with each holder, mechanism for filling said wrappers with tobacco, means for rotating said make-up device to bring said holders into operative relation with said mechanism, and means for bringing said gripping devices into engagement with said wrappers when the holders are in operative relation with said mechanism.

6. A cigarette making machine comprising in combination, a circular make-up device provided with a plurality of receivers or holders for the empty wrappers, a gripping device associated with each holder, mechanism for filling said wrappers with tobacco, mechanism for forming and inserting the mouthpiece, trimming mechanism, final ejecting mechanism, means for rotating said make-up device to successively bring said holders in operative relation to said mechanisms, and means for actuating said gripping devices to cause the same to grip the wrappers when the holders are in operative relation with said filling mouthpiece and trimming mechanisms and serving to release said wrappers when the holders are in operative relation with the final ejecting mechanism.

7. A cigarette making machine comprising in combination, a receiving hopper provided with a partition forming two compartments, the lower end of said partition having downwardly and outwardly diverging walls, said hopper being contracted at its lower end and provided with an outlet the margins of which form lower supporting walls, and a pair of discharge rollers located at said outlet and in operative relation to the outwardly diverging walls of the partition and the supporting walls of the hopper.

8. A cigarette making machine comprising in combination, a receiving hopper provided with a partition forming two compartments, the lower end of said partition having downwardly and outwardly diverging walls, said hopper being contracted at its lower end and provided with an outlet the margins of which form lower supporting walls, and a pair of discharge rollers located at said outlet and in operative relation to the outwardly diverging walls of the partition and the supporting walls of the hopper, said rollers being provided with stripping means.

9. A cigarette making machine comprising in combination, a receiving hopper provided with a partition having outwardly diverging walls, said hopper being provided with an outlet having supporting walls, and combined discharging and stripping rolls located at said outlet between said diverging and supporting walls.

10. A cigarette making machine comprising in combination, a receiving hopper provided with an outlet, feeding rollers operatively associated with said outlet, individually movable stripping fingers for said rollers, and means engaging each finger for effecting movement thereof.

11. A cigarette making machine comprising in combination, a receiving hopper provided with an outlet, feeding rollers operatively associated with said outlet, reciprocating stripping fingers for said rollers, fixed means engaging each finger to reciprocate them in one direction and yielding means for restoring said fingers.

12. A cigarette making machine comprising in combination, a receiving hopper provided with an outlet, feeding rollers operatively associated with said outlet, radially disposed independently reciprocating stripping fingers for said rollers, and separate and distinct devices for reciprocating said fingers in opposite directions.

13. A cigarette making machine comprising in combination, a receiving hopper provided with an outlet, feeding rollers operatively associated with said outlet, radially disposed independently reciprocating stripping fingers for said rollers, cams for operating said fingers in one direction, and springs for operating said fingers in an opposite direction.

14. A cigarette making machine comprising in combination, a receiving hopper provided with an outlet, feeding rollers operatively associated with said outlet composed of outer rotatable shells provided with radially disposed reciprocating stripping fingers, inner stationary cams for operating said fingers in one direction, and springs for operating said fingers in an opposite direction.

15. A cigarette making machine comprising in combination, a receiving hopper provided with an outlet, feeding rollers therefor composed of outer rotatable shells, radially disposed reciprocating spring pressed stripping fingers for said shells, and stationary cams engaging each finger to project the same from the peripheries of said shells during a portion of a rotation thereof and permitting retraction of said fingers during a portion of rotation of said shells.

16. A cigarette making machine comprising in combination, a receiving hopper, a pair of feeding rolls therefor composed of outer rotatable shells, longitudinally disposed rows of spring pressed reciprocating stripping fingers, retaining strips for guiding the outer end of said fingers, said fingers having enlargements or heads engaging said shells for guiding their inner ends, stationary cams adapted to engage said heads and project certain rows of stripping fingers from the peripheries of said rollers at predetermined points, said cams permitting retraction of certain rows of stripping fingers at other predetermined points.

17. A cigarette making machine comprising in combination, a feeding hopper, feeding rolls therefor, one of said rolls carrying a loosely mounted rack gear and a rigidly mounted ratchet wheel, a spring actuated pawl mounted on said rack gear and adapted to engage said ratchet wheel, a reciprocating rack, a spring normally holding said rack in a retracted position and a reciprocating cam bar provided with an inclined surface adapted to engage said rack to reciprocate the same in a feeding direction, said spring serving to return said rack in a non-feeding direction, and adjusting means for varying the extent of retractive movement of said rack bar.

18. A cigarette making machine comprising in combination, a pair of feeding hoppers, feeding rollers for each hopper, one of the rollers of each hopper carrying a loosely mounted rack gear and a rigidly mounted ratchet wheel, spring actuated pawls carried by said rack gears and adapted to coöperate with said ratchet wheels, alined rack bars for operating said rack gears arranged to bring their ends in close proximity and a reciprocating bar provided with downwardly and outwardly diverging surfaces adapted to operate said rack bars in unison.

19. A cigarette making machine comprising in combination, a paper reel, adjustable roller paper tighteners therefor, coöperating paper feeding rolls, coöperating paper cutting rolls associated therewith, mouthpiece forming mechanism, a movable paper guide adapted to receive the paper from said cutting rolls, and means for moving said guide to deliver the paper to said forming mechanism.

20. A cigarette making machine comprising in combination, coöperating paper feeding rolls, cutting rolls associated therewith, mouthpiece forming mechanism provided with an opening adapted to receive the paper, a guide interposed between said cutting rolls and forming mechanism, a spring normally holding said guide adjacent said cutting rolls, and means for moving said guide toward said forming mechanism to deliver the paper thereto.

21. A cigarette making machine comprising in combination, mouthpiece forming mechanism comprising an outer former tube, a former rotatively mounted therein and slotted at its outer end to receive the paper and provided with gripper cam engaging surfaces, a gripping device reciprocally mounted in said former and provided with spring paper grippers, cams adapted to engage said cam surfaces to compress said grippers, and means for reciprocating said device to permit the paper to enter the former and to subsequently grip the entered paper.

22. A cigarette making machine comprising in combination, mouthpiece forming mechanism comprising an outer former tube, a former relatively mounted therein and slotted at its outer end to receive the paper and provided with gripper cam engaging surfaces, a gripping device reciprocally mounted in said former and provided with spring paper grippers, cams adapted to engage said cam surfaces to compress said grippers, means for reciprocating said device to permit the paper to enter the former and to subsequently grip the entered paper, and ejecting mechanism for ejecting the finished mouthpiece from said former.

23. A cigarette making machine comprising in combination, mouthpiece forming mechanism composed of a rotatively-mounted former, a gripping device reciprocally mounted therein to grip and hold the paper while the mouthpiece is being formed, and means for operating said gripping device.

24. A cigarette making machine comprising in combination, mouthpiece forming mechanism composed of a rotatively mounted former, a gripping device reciprocally mounted therein to grip and hold the paper while the mouthpiece is being formed, means for operating said gripping device, and ejecting mechanism for ejecting the finished mouthpiece from said former.

25. A cigarette making machine comprising in combination, a mouthpiece forming mechanism composed of a rotatively mounted former, a gripping device reciprocally mounted in said former to grip and hold the paper while the mouthpiece is being formed, means for operating said gripping device, a make-up device in receiving proximity to said former, and ejecting mechanism for ejecting the finished mouthpiece from said former into said make-up device.

26. A cigarette making machine comprising in combination, a make-up device for holding the finished cigarette, a receiver adapted to receive the finished cigarette discharged therefrom, and oppositely acting rolling mechanism associated with said receiver.

27. A cigarette making machine comprising in combination, a make-up device for holding the finished cigarette, a receiver provided with a plurality of ledges for receiving the cigarette, means for operating said receiver to bring empty ledges in receiving proximity to said make-up device and oppositely acting rolling mechanism in receiving proximity to said ledges.

28. A cigarette making machine comprising in combination, a rotatable make-up device provided with a plurality of holders, gripping devices for each holder, a spring pressed arm for each gripping device, and a cam acting through said arms to operate said gripping devices to grip and release said wrappers or cigarettes at predetermined points.

29. A cigarette making machine comprising in combination, a make-up device provided with a plurality of holders, gripping devices for each holder, means associated with each gripping device and mechanism acting through said means to operate said gripping devices to grip and release said wrappers or cigarettes at predetermined points.

30. A cigarette making machine provided with make-up mechanism comprising in combination, a rotary makeup device, tubular cigarette holders therefor provided with oppositely disposed gripper openings, a pair of oppositely disposed grippers for each holder slidably mounted on said device and adapted to enter said openings and provided with actuating pins, a radially disposed slidable actuating arm for each holder forked at one end provided with angularly disposed slots adapted to receive and actuate said pins, a roller for the opposite end of each arm, a fixed cam disposed at the axis of rotation of said device, and springs for maintaining the rollers of said arms in engagement with said cam for effecting operation of said grippers.

31. A cigarette making machine provided with make-up mechanism comprising in combination, a rotary make-up device, tubular cigarette holders therefor provided with oppositely disposed gripper openings, a pair of oppositely disposed grippers for each holder slidably mounted on said device and adapted to enter said openings, a radially disposed slidable actuating arm for each holder operatively connected with said grippers at one end, a roller for the opposite end of each arm, a fixed cam disposed at the axis of rotation of said device, and a spring for each arm maintaining the roller thereof in engagement with said cam for effecting actuation of said grippers.

32. A cigarette making machine provided with make-up mechanism comprising in combination, a rotary make-up device, cigarette holders therefor, slidably mounted grippers for each holder, a radially disposed slidable actuating arm for each holder operatively connected with said grippers at one end, a roller for the opposite end of each arm, a fixed cam disposed at the axis of rotation of said device, and a spring for each arm maintaining the roller thereof in engagement with said cam for effecting actuation of said grippers.

33. A cigarette making machine provided with make-up mechanism comprising in combination, a rotary make-up device, cigarette holders therefor, grippers for each holder, an actuating arm for each holder operatively connected with said grippers at one end, a fixed cam for actuating said arms at the other end, and springs for holding said arms in operative relation to said cam.

34. A cigarette making machine provided with make-up mechanism comprising in combination, a make-up device, cigarette holders therefor, grippers for each holder, actuating arms for said grippers, and means for operating said arms to close said grippers after the wrapper has been inserted into said make-up device and open said grippers prior to ejection of the finished cigarette.

35. A cigarette making machine provided with make-up mechanism comprising in combination, a rotary make-up device, cigarette holders therefor, gripping means for each holder, actuating members for said grippers, and a single element associated with said members for closing said grippers during certain points in the operation of said make-up device and opening said grippers at other points in the operation thereof.

36. A cigarette making machine comprising in combination, a make-up device for holding the finished cigarette, a receiver adapted to receive the cigarette discharged therefrom and comprising a rotatable member provided with a plurality of peripherally disposed ledges, and oppositely acting rollers disposed below said member to receive and roll the cigarette.

In testimony whereof I affix my signature in presence of two witnesses.

FUKUTARO TONE.

Witnesses:
    MINAJI NAMBER,
    Y. FUKUKITA.